July 23, 1963 W. R. THOMPSON ETAL 3,098,957
SERVO SYSTEM FOR PEAK SIGNAL STORAGE
Filed Nov. 25, 1960 4 Sheets-Sheet 1

INVENTORS
WILMER R. THOMPSON
LOUIS J. ROGERS
BY
ATTORNEY

INVENTORS
WILMER R. THOMPSON
LOUIS J. ROGERS

BY
ATTORNEY

July 23, 1963   W. R. THOMPSON ET AL   3,098,957
SERVO SYSTEM FOR PEAK SIGNAL STORAGE
Filed Nov. 25, 1960   4 Sheets-Sheet 4

INVENTORS
WILMER R. THOMPSON
LOUIS J. ROGERS
BY
ATTORNEY

United States Patent Office 3,098,957
Patented July 23, 1963

3,098,957
SERVO SYSTEM FOR PEAK SIGNAL STORAGE
Wilmer R. Thompson, South Charleston, and Louis J. Rogers, Nitro, W. Va., assignors to Union Carbide Corporation, a corporation of New York
Filed Nov. 25, 1960, Ser. No. 71,549
10 Claims. (Cl. 318—19)

This invention relates to a novel system for detecting and storing peak signals from a cyclic signal system set having a predetermined periodicity and varying amplitude. More particularly, it relates to a system for individually storing each signal of the cyclic set and resetting the storage device as a new signal is received.

The present state of automatic process control in the chemical industry requires an ever increasing number of highly specialized instruments for performing detection, storage, analysis, and control functions.

In recent years, gas chromatography instruments have been developed which can be used to make extremely accurate quantitative measurements of the individual components of a multi-component gas stream.

These measurements have been successfully used to monitor and control certain chemical processes in conjunction with human apparatus and computing machines.

Briefly, a gas chromatograph is a device which physically separates the components of the multi-component gas system and produces a set of varying electrical output signals on which the maximum amplitude are proportional to the concentration of each component.

Thus, each time a sample measurement of a process stream is made by such a detection instrument, a series of electrical signals is obtained wherein the components are represented in the same order but wherein the amplitude of successive signals at the same position in the order will vary. It is also important that only the maximum amplitude or peak point in each signal is an accurate indication of the process variable being measured.

In past practice, a recorder which produces a bar graph for each signal has been connected to the chromatography detector and the maximum amplitude is read off by a human operator and an appropriate setting made on a computer. However, for maximum efficiency, accuracy, speed and above all complete automation of such a process, an apparatus is required which is capable of automatically determining the peak point of each successive signal in a set, storing such signal until needed, and resetting or re-adjusting to a new point when a subsequent corrective signal is received.

It is accordingly an object of the present invention to provide a data processing and storage apparatus which is capable of determining and storing the peak magnitudes of a plurality of signals in a signal set, wherein each signal has a varying magnitude and a predetermined periodicity and which is further capable of resetting each time a new signal set is received.

It is a further object to provide such a device which is capable of producing a calibrated electrical output signal suitable for direct feeding to a computer.

It is a still further object to provide such a device which is relatively simple, and inexpensive to manufacture.

Other objects and advantages will be apparent from the following description and drawings in which.

The objects of the invention are accomplished in general by a signal storage system for use with a chromatographic analyzer including an indicating device therefor wherein the output of the analyzer is a recurring signal set for each analysis having a plurality of individual signals each of which may vary in amplitude but which occur at predetermined times in each cycle. The indicating means is chosen to have a mechanical output whose magnitude is instantaneously proportional to the output of the analyzer. The signal storage system comprises a first means mechanically connected to the indicator for producing a first electrical signal proportional to the mechanical displacement of the indicator, and signal generating and storage means mechanically adjustable to develop and store a second electrical signal. The first and second electrical signals are then fed to an amplifier which detects and amplifies the difference between said two signals. A servo motor is connected to the output of the amplifier, operable on the output signal thereof, mechanically connected to adjust the storage means in a direction which will tend to reduce said difference between the first and second electrical signals. A phase detector is also connected to the output of the amplifier means which is operable to interrupt the signal to the motor means when the magnitude of the second electrical signal exceeds that of the first electrical signal; and wherein means selectively operable to reset the storage signal means output to zero are provided.

Thus, by means of the present invention the signal storage means is adapted to follow the input signal from the analyzer and indicator and keep increasing until the said input signal reaches a peak and then when the input signal starts to decrease the phase detector senses this change in a manner which will be more fully described later and disconnects the motor drive means from its energization source thus leaving the signal storage means set at its peak or maximum point. The zero reset means which is a timer operated cam suitably provides an energization source momentarily to the motor means for driving the storage means back to its zero position when it is desired to do so at which point it is again ready to select and store the signal peak from the next signal.

The invention will now be described in greater detail with respect to the drawings.

Figure 1:
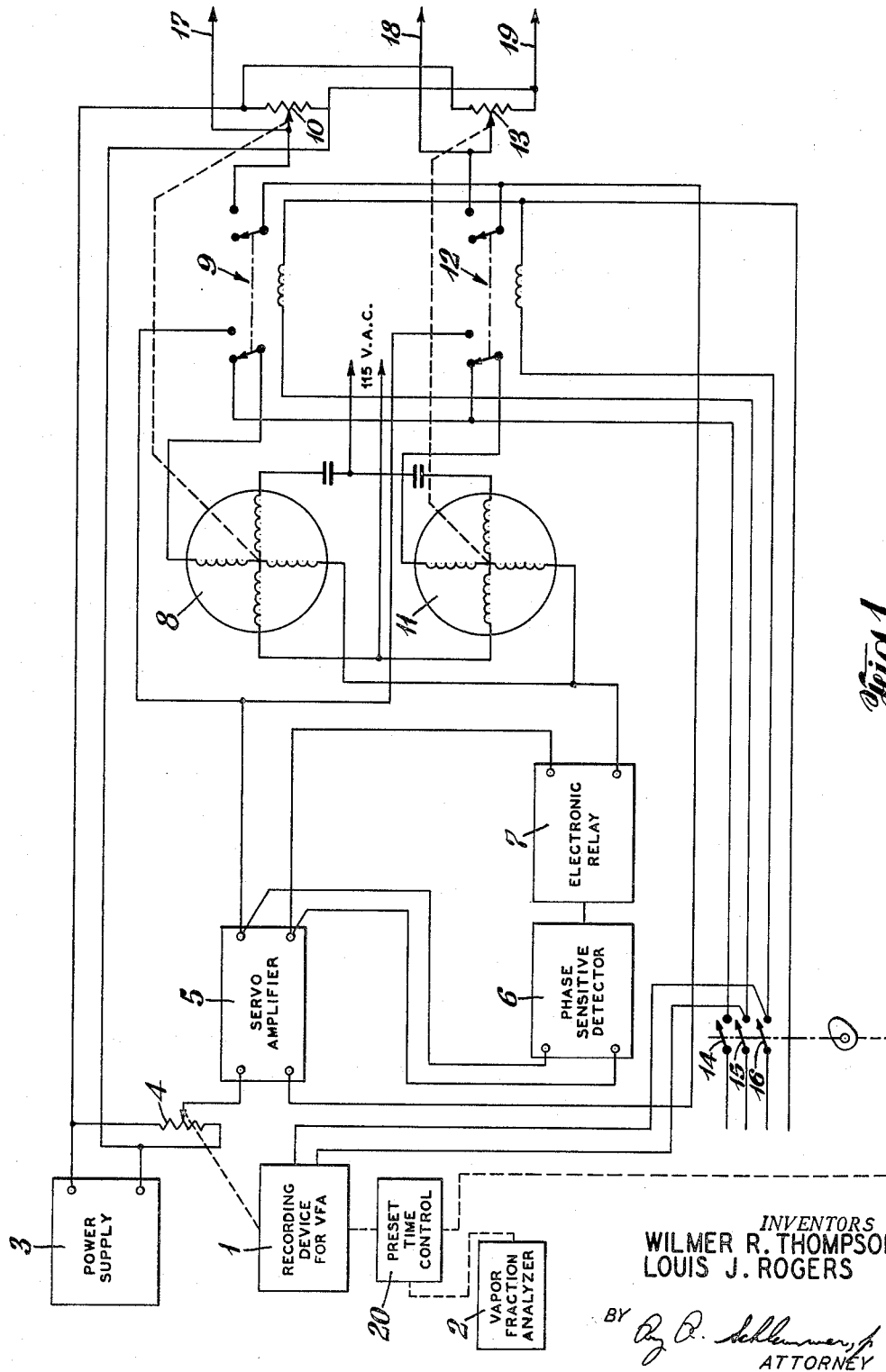
FIG. 1 is a combination block and schematic diagram of the apparatus of the instant invention.

FIGURE 1 is simplified somewhat for purposes of explanation in that only two signal storage potentiometers are shown. It is to be understood that normally there would be as many signal storage means as there are signals in a set or more particularly components in the gas stream and thus output signals from the analyzer to be placed in memory.

In a vapor fraction analyzer (gas chromatograph) a continuous and constant flow of carrier gas passes through a reference cell, which is sensitive to the thermal properties of the carrier gas, and into a separating column. Periodically multi-component gas samples are admitted into this carrier gas and are carried into the separating column. Each component separated within the column emerges from it admixed with carrier gas as a binary mixture. Each of the binary mixtures passes in succession through a measuring thermal properties cell and from thence to a vent line. The reference and measuring cells, which respond to the thermal properties of the gases flowing respectively therethrough, constitute the detector and the thermally responsive elements are connected into a Wheatstone bridge circuit whose output signals therefor are proportional to the difference between the thermal properties of the two gases, i.e.: carrier gas and binary mixtures. The passage of each of the binaries through the measuring cell is precisely timed by the programming timer of the chromatograph which also times the switching in of the responsive bridge signals to an appropriate bridge output signal receiver, such as a millivolt strip-chart recorder. It is, of course, to be understood that although thermal properties measuring cells are commonly used, other detection devices measuring other properties of gases can also be used to produce the varying output signals.

Referring to FIGURE 1, these output signals are fed into the subject invention by a series of the programmed timer switches, two of which are 15 and 16. The total number of switches is equal to the total number of gas components required for the analysis. When the gas component is being analyzed its corresponding channel switch 15 closes. (Later, when the next gas component is ready to be analyzed, 15 opens and the timer closes switch contact 16 or the contact to whatever channel is scheduled.) Switch 15 simultaneously energizes relay 9 and a component relay of the vapor fraction analyzer. This component relay switches the component signal to the vapor fraction analyzer recording device 1. At the same time, relay 9 is energized (relay 12 would be energized if switch 16 were closed, etc.) and connects servo motor 8 and storage potentiometer 10 into a servo loop with the retransmitting potentiometer 4, and servo amplifier 5. The gas component signal, applied from the analyzer detector 2 to the recorder 1 causes the recorder pen assembly to be driven up-scale. The recorder itself is a potentiometric device, with a servo amplifier of its own and a servo motor which drives the recorder pen, and records the millivolt signals derived from the detector. The retransmitting potentiometer 4 is mechanically coupled to the mechanism situated between the recorder servo motor and the recorder pen, so that the displacement of its wiper is made proportional to the detector output, and connects servo motor 8 and storage potentiometer 10 into a servo loop with the retransmitting potentiometer 4 and servo amplifier 5. The gas component signal, applied from the analyzer detector 2 to the recorder 1, causes the shaft of the retransmitting potentiometer 4 to rotate with an angular displacement proportional to the signal. The servo that drives the retransmitting potentiometer shaft also drives the recorder pen assembly up-scale and records a bar graph similar to FIG. 2 curve "b." This trace, curve "b," is made by allowing the chart to advance a space then recording "A" gas component indication with the chart stopped, letting it advance another space then recording the signal for "B" gas component, etc. The trace in curve "a" is made by letting the chart move at a constant speed to produce a spectrum. A D.C. voltage from the power supply 3 is applied continuously across the retransmitting potentiometer 4 and the storage potentiometers. (The retransmitting potentiometer 4 and all of the storage potentiometers 10, 13, etc. are all connected in parallel and supplied by a regulated D.C. power supply). When the recorder mechanism rotates the shaft of the potentiometer 4, its output voltage is connected to the servo amplifier 5. The output of the servo amplifier 5 drives servo motor 8 so that the shaft of storage potentiometer 10, connected in tandem, moves with it until the voltage developed at the wiper of storage potentiometer 10 is equal or approaches being equal to the voltage developed at the wiper of retransmitting potentiometer 4 at which time a null balance occurs. This servo action allows the wiper of the storage potentiometer 10 to follow the rotation of the wiper of the retransmitting potentiometer.

Figure 2:
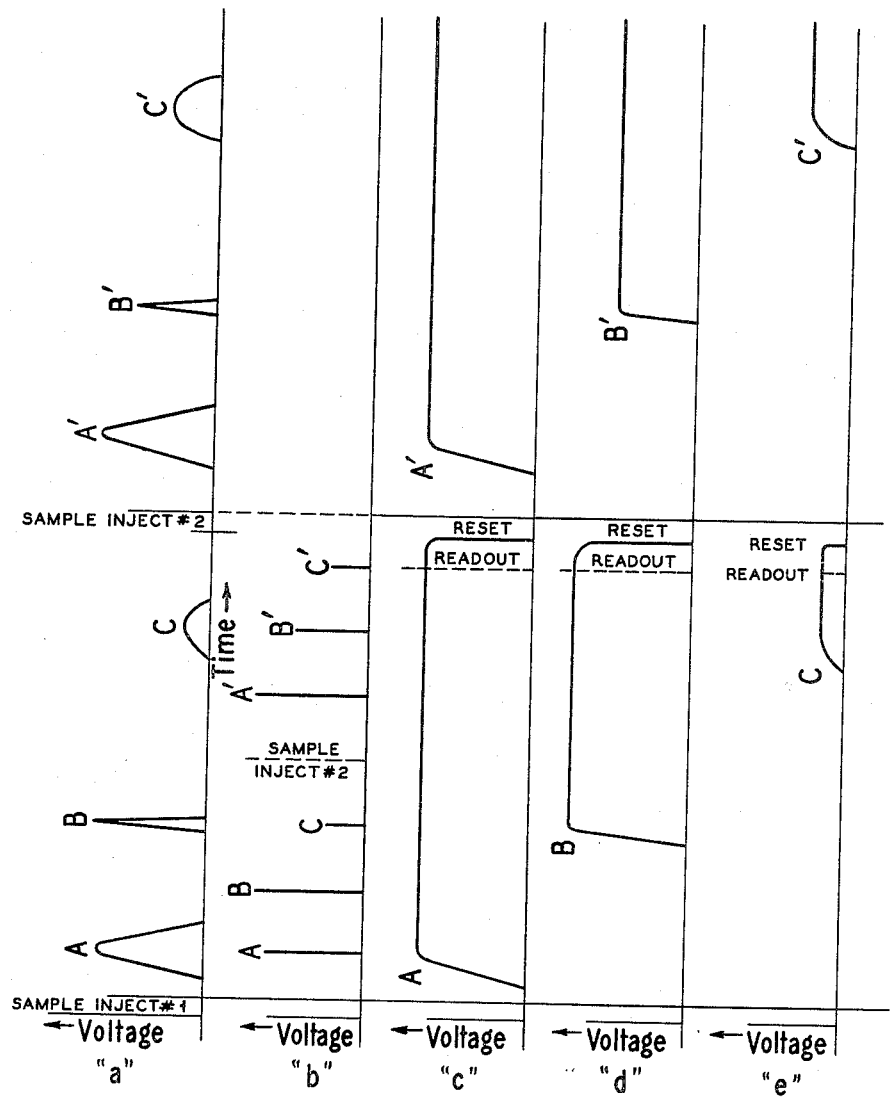
FIG. 2 is an exemplary graphical representation showing voltage waveforms taken at a plurality of points in the apparatus during a scheduled cycle of events.
Figure 3:
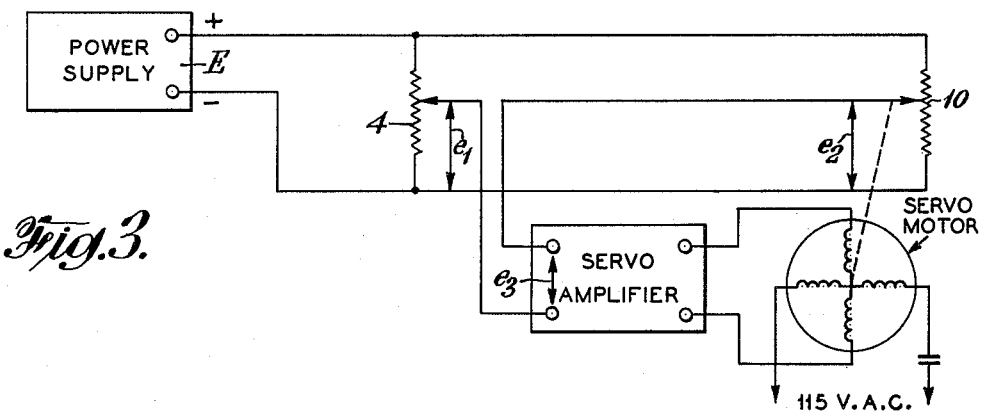
FIG. 3 is a combination block and schematic diagram showing in simplified form the details of the balancing circuit.

In order for a signal proportional to the gas concentration of component "A" to be stored by potentiometer 10, its wiper must follower the wipers of retransmitting potentiometer slidewire 4 in angular displacement to the maximum up-scale position corresponding to maximum indication for this gas component magnitude and remain there when the shaft of retransmitting potentiometer 4 returns to its zero position. FIG. 2, curves "c," "d," and "e" show the desired effect in graphical form. Instead of the signal returning to zero, as it does in curve "a," it rises as in "a" and then holds at a D.C. signal level equivalent to the peak magnitude for the component. To accomplish this, an input of a phase sensitive detector 6 is connected to the output of the servo amplifier 5 and output of the phase sensitive detector to the grid of a thyratron tube. The servo amplifier is very sensitive to D.C. voltage polarity reversals at its input, and its A.C. output will reverse 180° in phase if the D.C. input voltage reverses polarity. FIG. 3 is a simplified schematic and block diagram for the servo loop. The shaft of retransmitting potentiometer 4 will always move faster than that of storage potentiometer 10, because potentiometer 4 furnishes the unbalance signal to the servo loop and potentiometer 10 requires an interval of time to balance with it. If the slide contact of potentiometer 4 is moving in a positive direction as it would be when the recorder pen is drawing the leading edge of the recording for component "A," FIG. 2 curve "a"—the voltage $e_1$ will be greater than the voltage $e_2$, because the wiper of potentiometer 4 moves faster than that of potentiometer 10. The voltage applied to the input of the servo amplifier is $e_2$ minus $e_1$ and will be negative in this case. However, as the wiper of potentiometer 4 starts to move in the negative direction, it still moves faster than that of potentiometer 10; however, this time the voltage $e_1$ is less than the voltage $e_2$, so that, although the servo amplifier still receives the voltage $e_2$ minus the voltage $e_1$, it is now positive in polarity.

Figure 4:
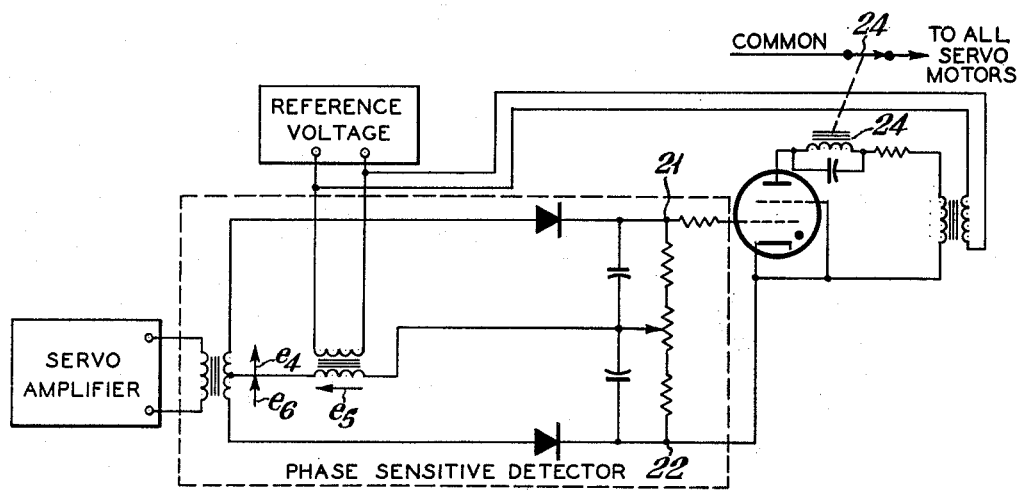
FIG. 4 is a schematic diagram of a preferred phase sensitive detector as used in the present invention.

The output of the servo amplifier is coupled to a phase sensitive detector (FIGURE 4). This detector is adjusted, so that the output of the servo amplifier voltages $e_4$, $e_6$, taken from each side of the center tapped transformer are each approximately equal to and either in phase or 180° out of phase with a properly chosen reference voltage $e_5$ which is fed into the aforementioned transformer outer tap. When a gas component signal is increasing in magnitude, the input to the servo amplifier is negative and the servo amplifier voltage $e_4$ is 180° out of phase with the reference voltage $e_5$, while $e_6$ is in phase therewith causing current to flow in the lower loop of the phase sensitive detector, and the net output by the phase sensitive detector to the thyratron grid is positive. The thyratron tube, which is normally fired will remain fired and hold relay 24 in its plate circuit closed. However, as was previously stated, the instant that the gas component signal starts to decrease, the input to the servo amplifier changes polarity; it becomes positive and because of the reverse of polarity there is a 180° shift in the servo amplifier output voltages $e_4$ and $e_6$. This time the two voltages $e_4$ and $e_5$ are in phase while $e_6$ and $e_5$ are out of phase causing current to flow in the upper loop of the phase sensitive detector to give a net negative D.C. output from the phase sensitive detector to the grid of the thyratron tube.

The thyratron tube is operated with an A.C. plate supply voltage derived from a transformer—usually 60 c.p.s. in frequency; and acts therefor as a half wave rectifier (the capacitor across relay 24 is to stop relay chatter) which does not conduct during the negative portion of the supply voltage. Since the output of the detector supplies a negative potential to the grid of the thyratron tube, it will remain cut-off after the plate voltage becomes positive. The relay in the thyratron tube plate circuit relay 24 opens when the tube stops conducting and breaks a common lead connecting all servo motors together thereby halting the shaft of storage potentiometer 10 instantly. A high level voltage representing the concentration of gas component "A" can now be measured across terminal points 17 and 19. The storage potentiometer 10 will store the indicated signal for the desired length of time and the shaft of potentiometer 4 returns to its zero position and is ready to indicate another gas component measurement.

Figure 5:
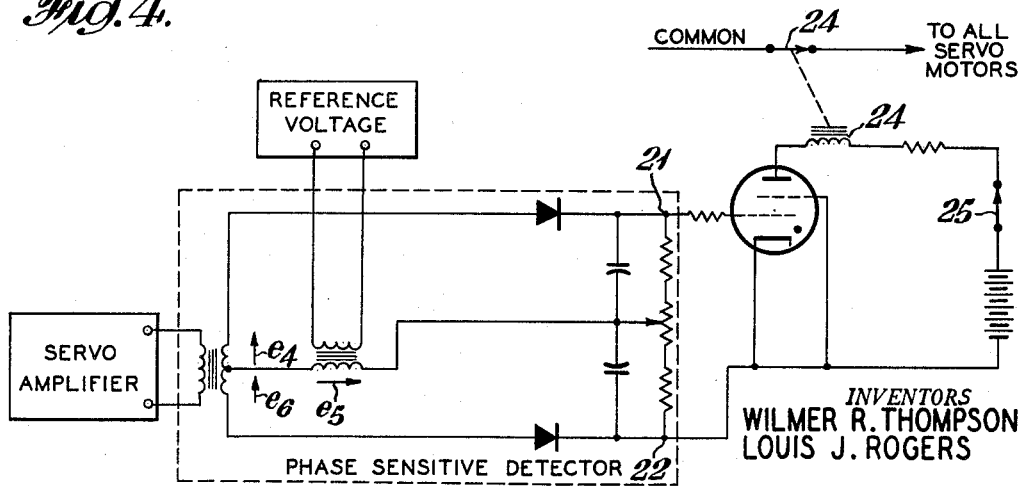
FIG. 5 is a schematic of an alternative embodiment of such a detector as shown in FIG. 4.

The thyratron tube can also be used as an electronic relay with a D.C. plate supply (see FIG. 5). In this case, the tube is normally not conducting and fires by applying a positive voltage from the phase sensitive detector. The phase of vector $e_5$ is reversed by reversing the reference voltage leads. In this case, the relay opens a common lead to the servo motors as before. Provision must be made, however, to stop the thyratron tube from conducting after it is fired. A switch 25 in the plate circuit accomplishes this by being opened mechanically by the recorder mechanism just before the retransmitting potentiometer shaft reaches its zero position to remove the plate voltage.

When gas component "B" enters the measuring cell of the analyzer, a signal is likewise generated by the analyzer detector. At this time, switch 16 operated by the analyzer program timer closes and simultaneously connects the signal produced by component "B" to the recorder and energizes relay 12. Relay 12 connects servo motor 11, storage potentiometer 13, servo amplifier 5 and the retransmitting potentiometer 4 into the servo loop. The storage of a signal on channel 2 of the memory device is accomplished identically as in the case of channel one described above. Additional channels can be connected to the two channel device shown in FIGURE 1 as desired. FIGURE 2 curves "c," "d," and "e" are examples of recorder pen traces which could be taken across 19 and the terminal for the section which is analyzing a component gas.

After the signals stored in the memory unit are read out by the computer, the memory unit storage potentiometer shafts are simultaneously returned to zero by automatically applying a zero reset voltage to their respective servo motors through switch 14. Switch 14 is a time delay relay switch operated by the main timer 20 and only applies the reset voltage long enough to drive all the shafts of storage potentiometers 10, 13, etc. to their zero positions. This is accomplished by connecting the line voltage of proper phase directly to the servo motors through switch 14. The time delay is set for about two seconds which permits the signal storage potentiometer shafts to be reset to zero.

Figure 6:
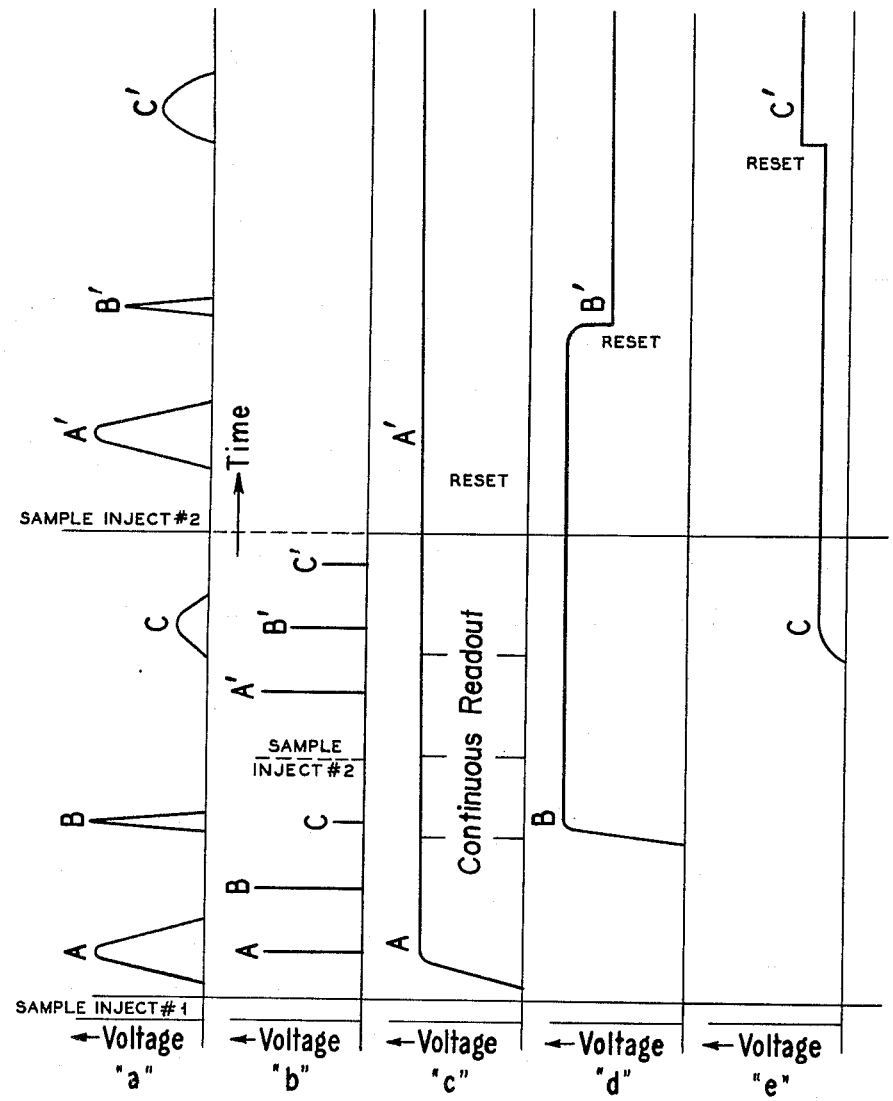
FIG. 6 is a graphical representation of voltage waveforms, of the type shown in FIG. 2, at various points in the apparatus wherein an alternative "reset" schedule is used.

FIGURE 6 is a series of curves similar to FIGURE 2 wherein the peaks of the first spectrum or signal set are held until each component of the second set is to be checked again. This furnishes a continuous readout. The peak for component A is held until A is analyzed again, then set to zero and reset, etc. This method is more desirable for some applications.

It is to be understood that the preset time control 20 which operates the switches 14, 15, and 16 and any additional storage channels which may be used, comprises a very accurate synchronous motor driving a shaft having appropriate switch actuating cams mounted thereon. These cams are set in accordance with the known elution times of components from the analyzer. Thus, when it is known that component "A" is about to be eluated and an appropriate signal generated by the analyzer, the cam that operates switch 15 is adjusted to actuate that channel and so on for each channel. The cam which operates the zero reset switch 14 is set to operate at the end of a complete analyzing cycle.

The invention thus disclosed and described comprises a group of electrical components and circuitry in combination which function, in a unique manner, as a multichannel memory device for storing the peak magnitudes of intermittent signals generated by a vapor fraction analyzer. This memory device permits the analyzer to function as a measuring instrument in a computer controlled chemical process, thus making possible the completely automatic control of a number of complex gas phase chemical reactions heretofore impossible. It is believed that the present invention will have great commercial success in the chemical instrumentation and control field. While the description has been limited to a vapor fraction analyzer, the instant system could be equally well adapted for use with any device having a similar electrical output characteristic.

While certain embodiments of the invention have been shown and described for purposes of description, it is to be understood that certain changes and substitutions could be made by a person skilled in the art without departing from the spirit and scope of the invention.

What is claimed is:

1. A signal processing system for determining and storing the peak magnitude of a recurring signal having varying amplitude occurring at fixed predetermined times, said system comprising signal storage means mechanically adjustable to develop and store a second electrical signal, means connecting said first and second electrical signals to an amplifier means which detects and amplifies the difference in magnitude and direction between said two signals, motor means connected to the output of said amplifier operable on said output signal mechanically connected to said storage means for adjusting same in a direction which will reduce the difference between the first and second electrical signals and phase detection means also connected to the output of the amplifier means which will produce an output signal when the magnitude of the second electrical signal exceeds the magnitude of the first electrical signal, and means connected to the output of said phase detector means for interrupting power to the motor means upon an output therefrom.

2. A signal storage system as set forth in claim 1 wherein the output of the amplifier means is an alternating current signal which reverses 180° in phase when the direction sense between the two signals reverses and wherein the phase detector means compares the phase of said amplifier output signal with a reference alternating current signal and controls the means connected to the output of said phase detector means for interrupting power to the motor means upon an output therefrom in accordance with the phase relationship therebetween.

3. A signal processing system as set forth in claim 2 wherein the means connected to the output of said phase detector means for interrupting power to the motor means upon an output therefrom comprises a thyratron tube connected between its cathode and grid electrode to the output of the phase detector.

4. A signal processing system as set forth in claim 3 adapted for use with recurring signal sets each set having a plurality of individual signals of varying magnitude occurring at fixed predetermined times, wherein a plurality of signal storage means and associated motor means are provided which are selectively connectable to the amplifier means.

5. A signal processing system as set forth in claim 3 wherein the signal storage means is a precision potentiometer.

6. A signal processing system as set forth in claim 4 including reset means for simultaneously returning all of said signal storage means to zero simultaneously, said reset means comprising timer operated switch means for applying a reset voltage to the motor means.

7. A signal processing system as set forth in claim 4 including reset means for returning each signal storage means to zero just before a new signal is reecived, said reset means including a timer operated switch for applying a reset voltage to the drive motor for each said signal storage means.

8. A signal storage system for use with a chromatographic analyzer and an indicating device therefor wherein the output of the analyzer is a recurring signal set each set having a plurality of individual signals of varying amplitude occurring at fixed predetermined times and the output of the indicator is a mechanical displacement proportional to the instantaneous amplitude of each signal, which analyzer comprises first means mechanically connected to the indicator for producing a first electrical signal proportional to said mechanical displacement, signal storage means mechanically adjustable to develop and store a second electrical signal, means connecting said first and second electrical signals to an amplifier means for producing an output signal when a difference exists between said two signals, motor means connected to the output of said amplifier operable on said output signal mechanically connected to said storage means for adjusting same in a direction which will reduce the difference between the first and second electrical signals and phase detection means also connected to the output of the amplifier means which will produce an output signal when the magnitude of the second electrical signal exceeds the magnitude of the first electrical signal, means connected to the output of said phase detector means for interrupting power to the motor means upon an output therefrom, and means selectively operable to reset said signal storage means to zero.

9. A signal storage system as set forth in claim 8 wherein there are a plurality of motor and signal storage means and wherein timer operated switch means are provided to sequentially connect each motor and signal storage means to the amplifier means in accordance with the recurrence rate of the signal set.

10. A signal storage system as set forth in claim 8 wherein the signal storage means comprises a potentiometer.

References Cited in the file of this patent
UNITED STATES PATENTS

| | | |
|---|---|---|
| 2,028,110 | Taylor | Jan. 14, 1936 |
| 2,425,733 | Gille et al. | Aug. 19, 1947 |
| 2,994,020 | Buffet-Beauregard et al. | July 25, 1961 |
| 3,026,502 | Rogers et al. | Mar. 20, 1962 |